United States Patent [19]

Benson et al.

[11] 4,121,708
[45] Oct. 24, 1978

[54] FOLDED SPRINGS FOR VIBRATORY FEEDERS AND CONVEYORS

[76] Inventors: William H. Benson, 2421 Plum St., Erie, Pa. 16502; Thomas H. Falconer, 2421 Brentwood Cir., Erie, Pa. 16506

[21] Appl. No.: 798,752

[22] Filed: May 20, 1977

Related U.S. Application Data

[63] Continuation of Ser. No. 573,667, May 1, 1975, abandoned.

[51] Int. Cl.$^2$ .............................................. B65G 27/00
[52] U.S. Cl. ................................... 198/766; 198/767; 248/18; 248/358 AA
[58] Field of Search .................... 198/759, 766–770; 267/136, 137, 160; 248/15, 17, 18, 358 R, 358 AA

[56] References Cited

U.S. PATENT DOCUMENTS

| | | | |
|---|---|---|---|
| 2,753,176 | 7/1956 | List | 248/358 R |
| 3,075,644 | 1/1963 | Ambrose | 198/766 |

FOREIGN PATENT DOCUMENTS

| | | | |
|---|---|---|---|
| 796,161 | 6/1958 | United Kingdom | 198/759 |
| 823,857 | 11/1959 | United Kingdom | 198/759 |

*Primary Examiner*—Evon C. Blunk
*Assistant Examiner*—Joseph E. Valenza
*Attorney, Agent, or Firm*—Charles L. Lovercheck

[57] ABSTRACT

The specification discloses a spring for powering a vibratory feeder or conveyor made up of a first leaf spring and a second leaf spring in closely spaced relation to each other. The ends of each of the two leaf springs are rigidly clamped to corresponding ends of one another and a spacer is rigidly clamped between the springs at said ends. The center of one spring leaf is fixed to the conveyor, while the center of the other spring leaf is fixed to a vibratory motor.

2 Claims, 19 Drawing Figures

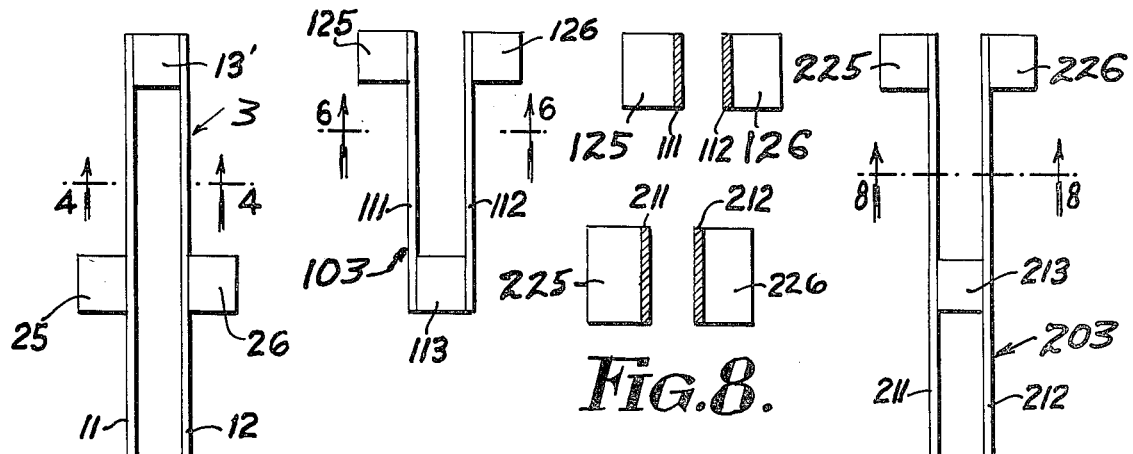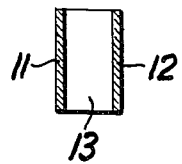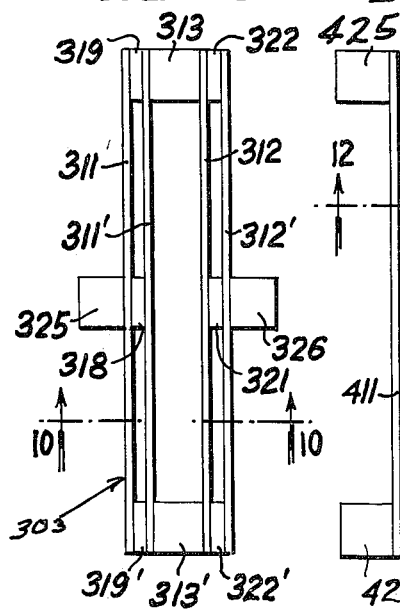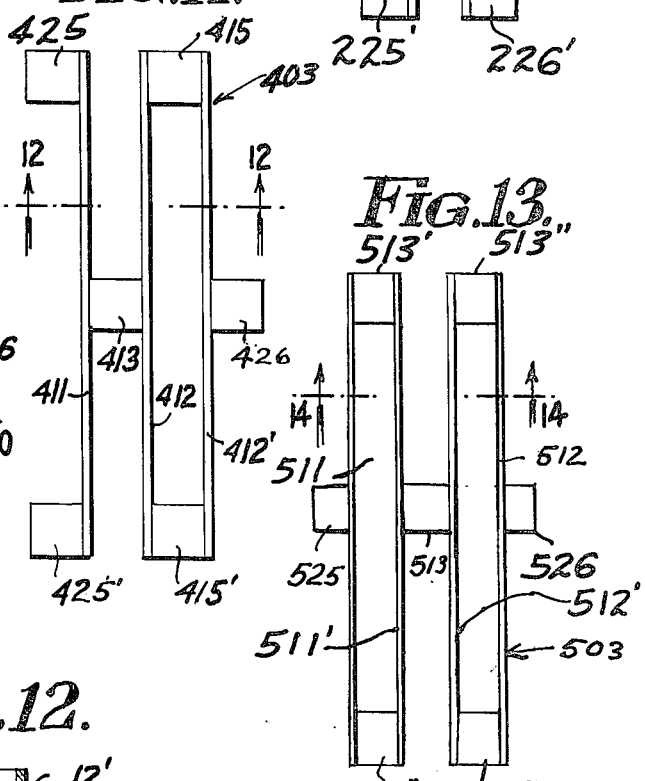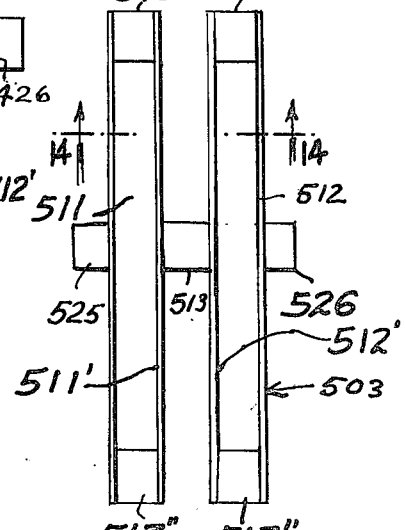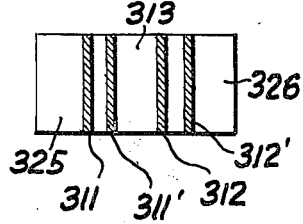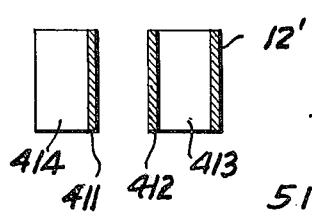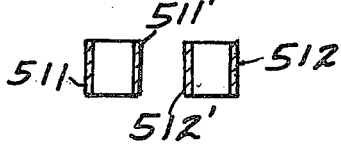

FOLDED SPRINGS FOR VIBRATORY FEEDERS AND CONVEYORS

This is a continuation of application Ser. No. 573,667, filed May 1, 1975, now abandoned.

GENERAL DESCRIPTION OF INVENTION

Due to the high deflection of mechanical vibrating conveyors and feeders, the use of leaf (flat) springs is limited. The high deflections cause high tensile stresses in the springs resulting in occasional failure. This application discloses a leaf spring especially suited for vibratory equipment.

Conventional straight flat leaf springs used in vibratory equipment are of two general types, (1) Wherein the leaf spring is solidly attached to one mass at one end and the other end of the leaf spring is solidly attached to another mass, and (2) Wherein both ends of the leaf springs are attached to one mass and the center attached to another mass. These kinds of leaf springs are subject to disadvantages, (1) the motion of the mass in the first case is not a straight line and the required effective length of the leaf springs is sometimes excessive for the particular application, and (2) stresses and limitations of movement exsist in the second case due to the captive ends of the leaf springs and again the required effective length is sometimes excessive.

The structure disclosed herein eliminates, to a large extent, all of the above mentioned disadvantages in that (a) motion of the masses is always in a straight line and (b) due to the unique configuration of the spring elements, the required effective length can be obtained with minimal overall length and (c) due to the unique configuration, stress in the leaf springs can be minimized and limitations of movement can be greatly extended. There are several classic configurations of the spring elements, and examples of these are disclosed. Im some cases, springs of other cross sectional configurations than leaf springs can be utilized, as will appear hereinafter.

REFERENCE TO PRIOR ART

British Pat. No. 823,857 discloses a mechanical spring system for supporting vibratory conveyor equipment wherein a series of layers of spring leaves are supported on a trough conveyor and a motor is supported between some of the spring leaves. The spring leaves are held in compression and the outer ends of the spring leaves rest on the spacers and are not rigidly connected together so that the springs act as simple beams and not as cantilever beams as in the present application so that the flexture stress at the outer ends of the springs is not utilized in the springs.

U.S. Pat. No. 2,753,176 shows a spring system wherein the outer ends of the spring leaves are fixed together by a bar. In the specification, Column 1, Lines 59-66 it states that the springs sometime go out of control and a stop for stationary stop is provided to limit the stroke is necessary. This stop could cause serious repercussions resulting in failure of the entire spring system and applicant's structure does not require such a stop. Thus, applicant has eliminated this stop yet retained its functions by the structure recited in the claims. The said U.S. Pat. No. 2,753,176 is further different from that of applicant's in the masses 5 and 6 are stationary.

OBJECTS OF THE INVENTION

It is an object of the invention to provide an improved vibratory feeder or conveyor, by improving the springing system.

Another object of the invention is to provide an improved vibratory feeder in combination with an improved leaf spring.

Another object of the invention is to provide an improved vibratory feeder and leaf spring combination that is simple in construction, economical to manufacture and efficient in use.

With the above and other objects in view, the present invention consists of the combination and arrangement of parts hereinafter more fully described, illustrated in the accompanying drawings and more particularly pointed out in the appended claims it being understood that changes may be made in the form, size, proportions, and minor details of construction without departing from the spirit or sacrificing any of the advantages of the invention.

GENERAL DESCRIPTION OF DRAWINGS

FIG. 3 is a spring assembly according to the invention.

FIG. 4 is a cross sectional view taken on line 4—4 of FIG. 3.

FIG. 5 shows another embodiment of spring bars according to the invention.

FIG. 6 shows a cross sectional view taken on line 6—6 of FIG. 5.

FIG. 7 is another embodiment of the invention.

FIG. 8 is a cross sectional view takne on line 8—8 of FIG. 7.

FIG. 9 is another embodiment of the invention.

FIG. 10 is a cross sectional view taken on line 10—10 of FIG. 9.

FIG. 11 is a view of another embodiment of the invention.

FIG. 12 is a cross sectional view taken on line 12—12 of FIG. 11.

FIG. 13 is a side view of another embodiment of the invention.

FIG. 14 is a cross sectional view taken on line 14—14 of FIG. 13.

DETAILED DESCRIPTION OF DRAWINGS

Figure 1:
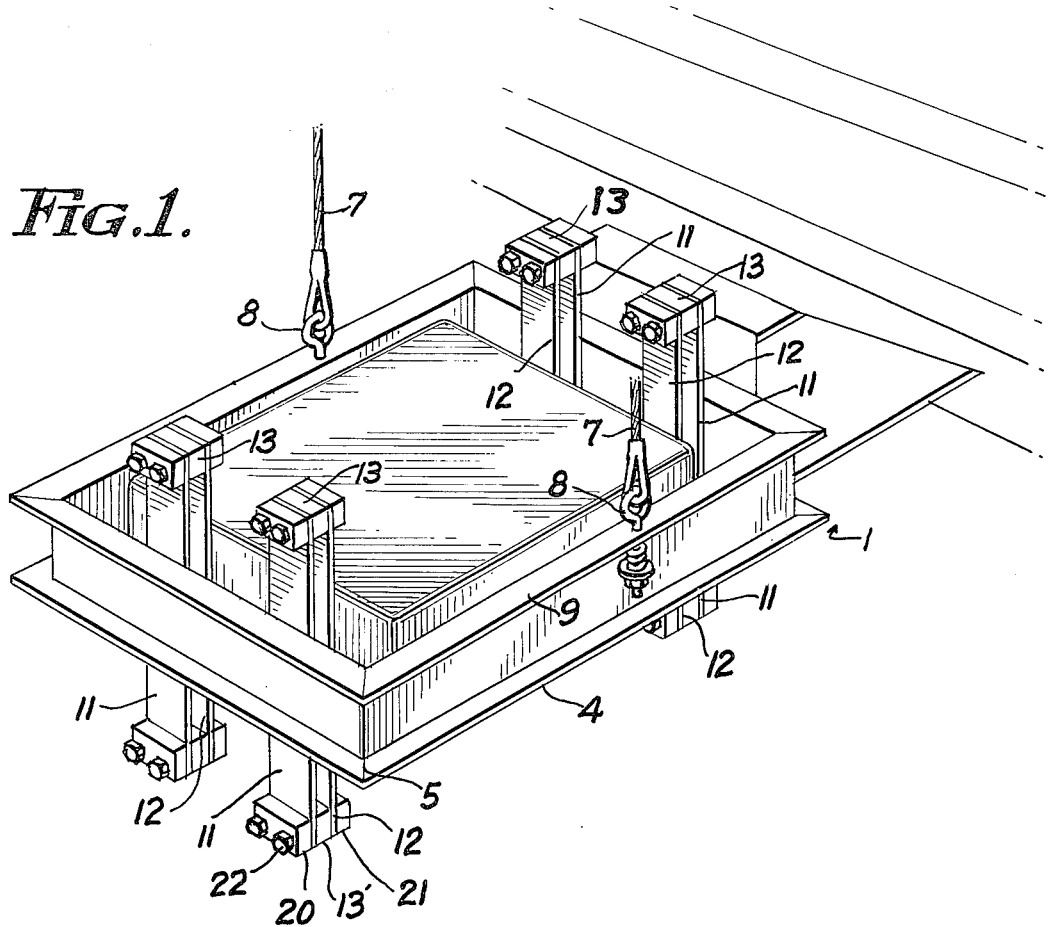
FIG. 1 is an isometric partial view showing a vibratory motor, frame, and an improved spring arrangement supporting the motor on the frame.
Figure 2:
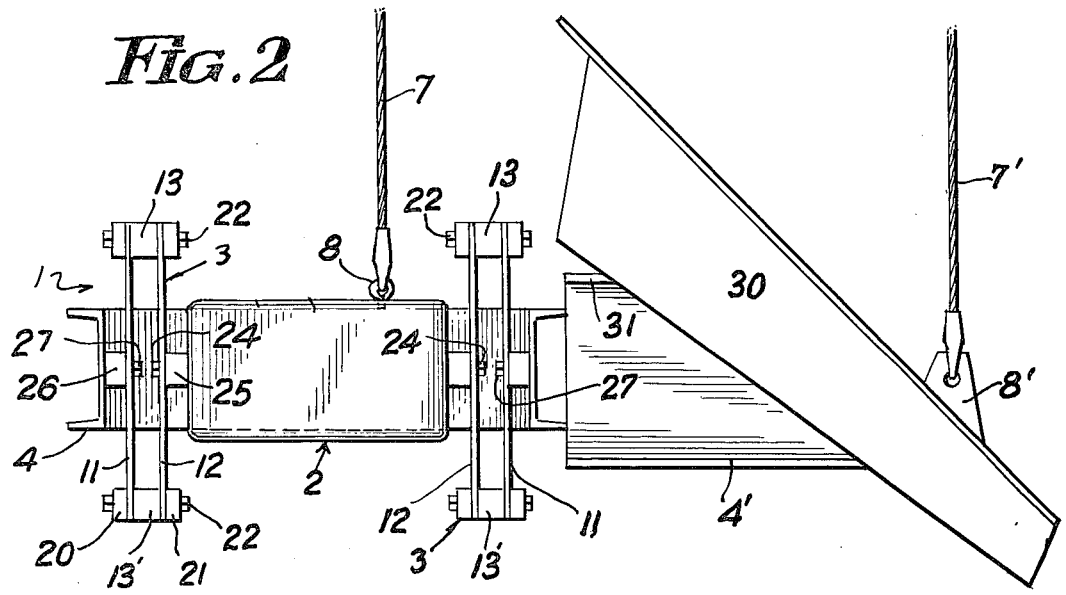
FIG. 2 is a side view of the vibratory motor shown in FIG. 1 with a tray attached.

Now with more particular reference to the drawing, in the embodiment of FIGS. 1 & 2, a conveyor indicated generally at 1 is of a type familiar to those skilled in the art. It is shown having a vibratory motor 2 supported by spring members 3 which are supported on the frame 4. The frame may be made of the channel sections welded together at the corners 5 in a manner familiar to those skilled in the art. The springs 3 are each made up of a first bar 11 and a second bar 12 with a spacer 13 between one of the ends of the bars 11 and 12 and a spacer 13' between the opposite ends of the bars 11 and 12. A leaf is a specifically shaped bar.

Suitable lugs 20 and 21 receive the bolts 22 whereby the ends of the leaves 11 and 12 are sandwiched between the spacers 13 and the outer lugs 20 and 21, and held rigidly together.

The vibratory motor 2 is suspended by a suitable cable support 7, connected to the motor 2 by eye 8 and to the feeder tray 30, which is supported by cable 7' in eye 8'. Rigid bracket 4' rigidly connects frame 4 to tray 30. Various types of suitable motors, for driving the conveyor, may be used which are familiar to those skilled in the art.

The ends of the vibratory motor 2 are secured to spring leaf 12 by bolts 24 with a spacer 25 therebetween. The bolt 24 passes through a suitable opening in the spring leaf 12 and threadably engages the vibratory motor 2.

The intermediate part of the leaf 11 of the spring 3 shown at the left-hand side of the FIG. 2 is fixed to the frame 4 by means of a bolt 27, which clamps the leaf 11 rigidly to the frame 4. Four springs 3 support the motor 2 on frame 4.

Each of the four springs 3, has its leaf 11 fixed to the frame 4 by means of a bolt 27 which sandwiches the spacer 26 between the frame 4 and the leaf 11, and rigidly clamps the spring to the frame 4; and bolts 25 clamp the leaves 12 rigidly to the motor 2.

The feeder tray 30 is fixed to the bracket 31 and bracket 31 is fixed to the frame 4 by suitable welding or the like.

In the embodiments hereinafter, index numerals having the same last two digits, identify similar parts. The springs 3 may be considered as comprising a first bar or leaf 11 and a second bar or leaf 12, each made of resilient material which may be round, but preferably rectangular in cross section and disposed and spaced generally parallel in relation to each other. A spacer means 13 is disposed between the ends of the bars or leaves and rigidly attached thereto, and load means, which may be considered to be frame 4 and tray 30, is rigidly attached to the center of one of the leaves or bars and spaced therefrom.

The spring elements 11 and 12 can be stacked parallel individual leaf springs or they can be made of different thicknesses desired for purposes of facilitating tuning the springs relative to a desired frequency.

Springs 11 and 12 can be made of parallel springs with spacers between them as shown in the embodiment of FIGS. 8 and 9. Here the springs 311 and 311' are held in rigid spaced relation by the spacers 318, 319 and 319' while the spring leaves 312 and 312' are held in spaced relation by spacers 321, 322 and 322'. This arrangement of spring leaves may have certain advantages in tuning the springs to resonate at a particular frequency.

In the embodiment of FIGS. 7 and 8, the center of the leaves 211 and 212 are clamped together with spacer 213 between them and the ends of the spring leaves 211 and 212 are fixed to spacers 225, 225' and 226 and 226'. In this embodiment, the tray may be attached to the spacers 225 and 225' and the motor may be attached to 226 and 226'.

The embodiment of the invention shown in FIG. 11 shows spring leaves 411 and 412 that are rigidly clamped to spacer 413 at the midpoint of the leaves, similar to the embodiment of the invention shown in FIG. 7. It will be noted that spring leaves 412 and 412' are clamped together by the spacers 415 and 415' forming an assembly like the embodiment of FIG. 3, thus the embodiment of FIG. 11 is a composite of the embodiments of FIGS. 3 and 7. This embodiment may provide proper spring rate and stress level values. Any number of combinations of this type could be used.

The embodiment of the invention shown in FIGS. 13 and 14 is a composite of a series-parallel spring arrangement when the leaves 511' and 512' are clamped together at their midpoints by spacers 513 and at the points of spring leaves 511 and 511' are clamped together at their ends by spacers 513' and 513" while spring leaves 512 and 512' are clamped together a their ends by spacers 513" and 513'". The tray may be rigidly clamped to the spacer 525 and a vibratory motor may be clamped to the spacer 526 to support a tray and motor assembly such as supported by the springs 3 in FIGS. 1 and 2.

Figure 15:
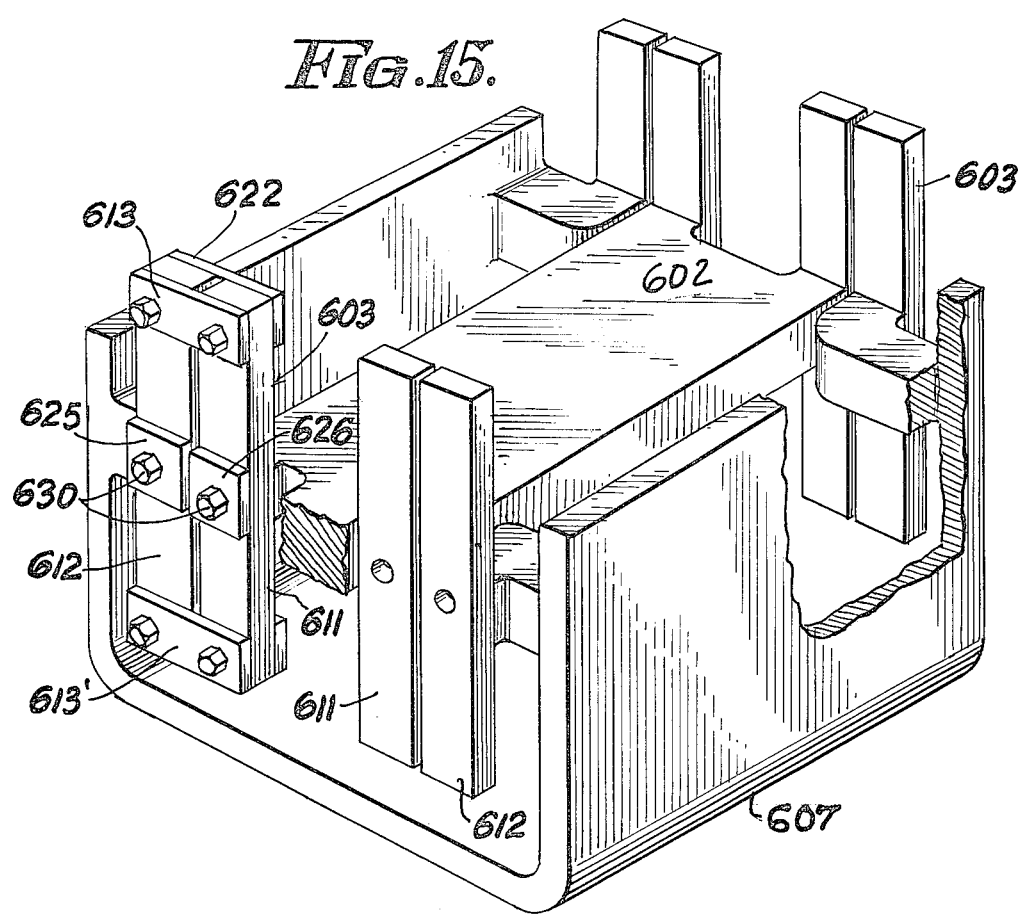
FIG. 15 is an isometric view of another embodiment of the invention.
Figure 16:
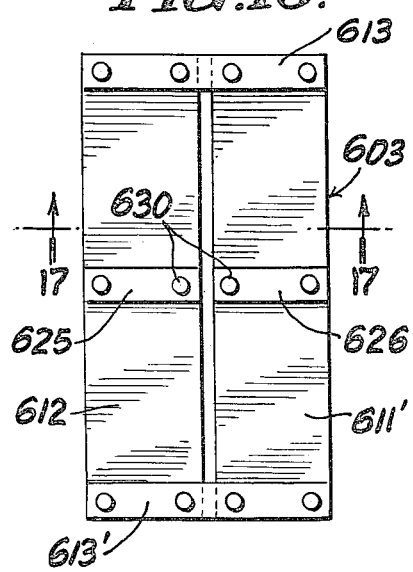
FIG. 16 is a side view of the embodiment of FIG. 15.
Figure 17:
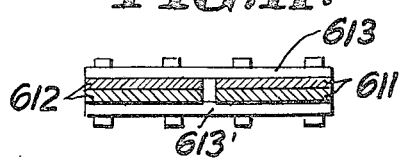
FIG. 17 is a cross sectional view taken on line 17—17 of FIG. 16.

FIGS. 15, 16 and 17 show another embodiment of spring suspension wherein a conveyor base 704 supports a vibratory motor 702, by means of spring assemblies 703. Each of these spring assemblies are made up of spring leaves 711 and 712 clamped together at their ends by clamps 713 and 713', by means of bolts 722 and spring leaf 711 is clamped to the motor 702 by bolts 724, while spring leaves 712 are clamped to the frame 704 by bolts 727. In the embodiment of FIGS. 15-17, the spring leaves 711 and 712 are disposed in a common plane.

Figure 18:
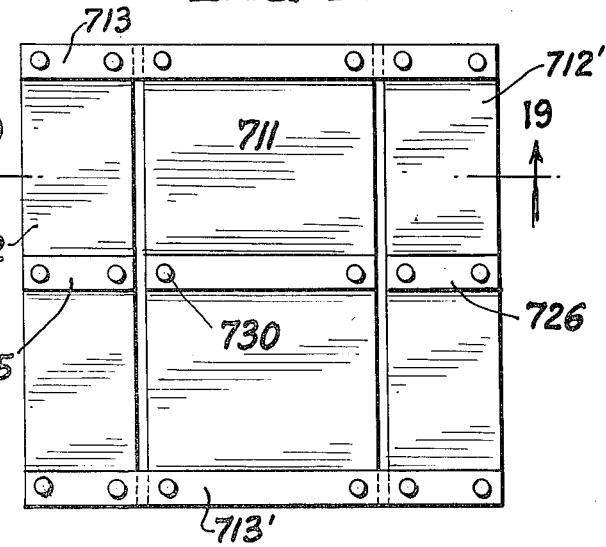
FIG. 18 is a side view of another embodiment of the invention.
Figure 19:
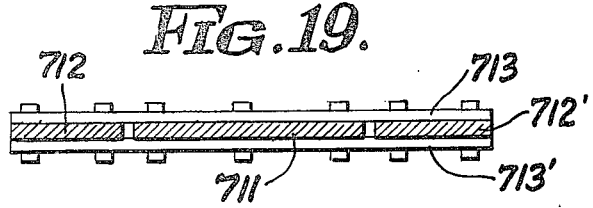
FIG. 19 is a cross sectional view taken on line 19—19 of FIG. 18.

In the embodiment of the invention shown in FIGS. 18 and 19, the spring leaves 811 and 812 and 812' are provided, supported in a common plane. The ends of the spring leaves are rigidly clamped together by spacers 813 and 813', held in place by bolts 830 while the spacer 825' may be attached to a vibratory motor and a feeder frame could be connected to the spacers 820 at either side of the leaf 811.

In each of the embodiments shown in FIGS. 15-19, various other combinations of spring leaves can be provided wherein two elements, or pairs of elements share the total displacement in the same way as two equal halves of equivalent straight springs share the total displacement. Since the elements 711 and 712 are, in effect, folded over side-by-side they have a much shorter over-all length than the equivalent single spring for the same stress levels. Furthermore, the two movements in the bolt and spring are straight-line (parallel), while the movements of the single straight spring would tend to be arculate with respect to one another, as in the embodiments of the invention shown in FIGS. 1-14.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A vibratory conveyor comprising,
   a frame,
   a conveyor member fixed to said frame,
   said frame having two spaced parts,
   a motor between said two spaced parts of said frame,
   means suspending said motor and said frame,
   a first spring on one side of said motor between said motor and said frame and a second spring at the second side of said motor between said motor and said frame, said springs each comprising a first leaf having a first end and a second end and a second leaf having a first and a second end, first spacer means between said first end of said first leaf and said first end of said second leaf rigidly connecting said first ends together, the ends of said springs being free to vibrate with each other, second spacer means between said second ends of said first leaf and said second end of said second leaf rigidly connecting said second end of said first leaf and said second end of said second leaf in spaced relation to each other, third spacer means between the mid-points of said first leaves and said motor, fourth spacer means rigidly connecting said mid-points of said second leaves to said frame.

2. The vibratory conveyor recited in claim 1 wherein two said first springs are provided at one side of said motor means and two said second springs are provided at the other side of said motor.

* * * * *